United States Patent [19]
Kawai et al.

[11] Patent Number: 5,974,366
[45] Date of Patent: Oct. 26, 1999

[54] APPARATUS FOR DETECTING THE LANDING POSITION OF FOOT SOLE OF LEGGED MOVING ROBOT

[75] Inventors: Takayuki Kawai; Toru Takenaka; Takashi Matsumoto; Tadaaki Hasegawa, all of Wako, Japan

[73] Assignee: Honda Giken Kogyo Kabushiki Kaisha, Tokyo, Japan

[21] Appl. No.: 08/992,849

[22] Filed: Dec. 18, 1997

[30] Foreign Application Priority Data

Dec. 18, 1996 [JP] Japan ................................. 8-338341

[51] Int. Cl.$^6$ ............................................... G06F 7/70
[52] U.S. Cl. ................... 702/150; 364/167.01; 702/152; 318/568.12
[58] Field of Search ................... 364/167.01; 702/150, 702/151, 152, 153; 318/568.12

[56] References Cited

U.S. PATENT DOCUMENTS

| 5,255,753 | 10/1993 | Nishikawa et al. ...................... 180/8 |
| 5,402,050 | 3/1995 | Ozawa ............................. 318/568.12 |
| 5,513,106 | 4/1996 | Yoshino et al. ................... 364/424.02 |
| 5,594,644 | 1/1997 | Hasegawa et al. .............. 364/424.027 |
| 5,737,217 | 4/1998 | Nishikawa et al. ................. 364/167.01 |

FOREIGN PATENT DOCUMENTS 3-184781 of 1991 Japan .
7-205085 of 1995 Japan .

OTHER PUBLICATIONS

English language translation of Abstract of JP 3–184781.
English language translation of Abstract of JP 7–205085.

*Primary Examiner*—Kamini Shah
*Attorney, Agent, or Firm*—Lyon & Lyon LLP

[57] ABSTRACT

A legged moving robot has a plurality of movable legs for repeatedly touching and leaving a floor. An apparatus for detecting the landing position of a foot sole of each of the movable legs has a force sensor mounted on each of the movable legs at a position spaced from a foot sole thereof toward a proximal end thereof. The force sensor detects at least a perpendicular force perpendicular to the foot sole and a moment about an axis extending in a lateral direction of the foot sole and passing through a predetermined reference point on the foot sole. A time when the foot sole touches or leaves the floor is detected on the basis of the perpendicular force detected by the force sensor. A landing position for the foot sole to start touching or end leaving the floor is determined on the basis of the perpendicular force and the moment detected by the force sensor, at the detected time or in a predetermined time range near the detected time.

13 Claims, 11 Drawing Sheets

LANDING POSITION DETECTING SUBROUTINE

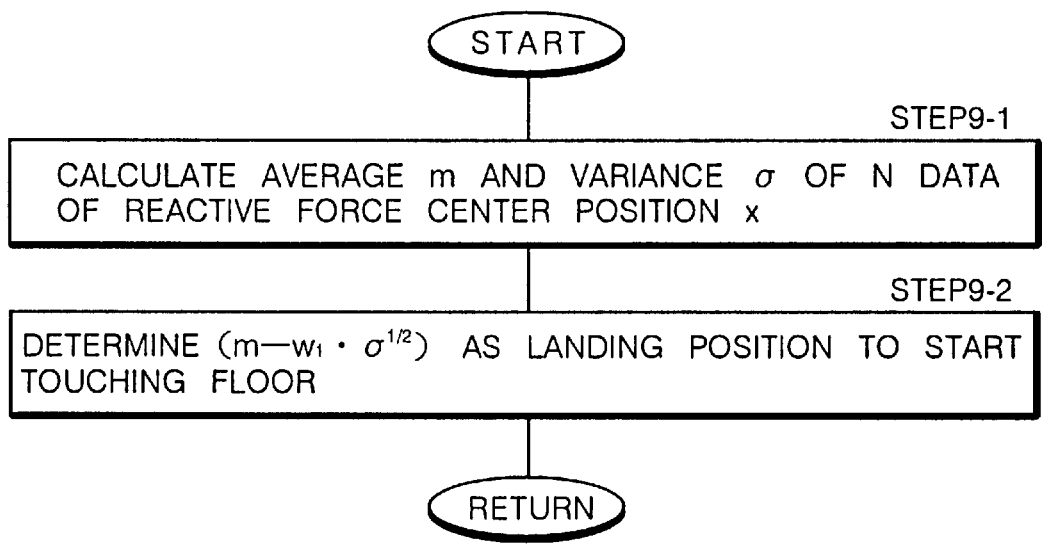
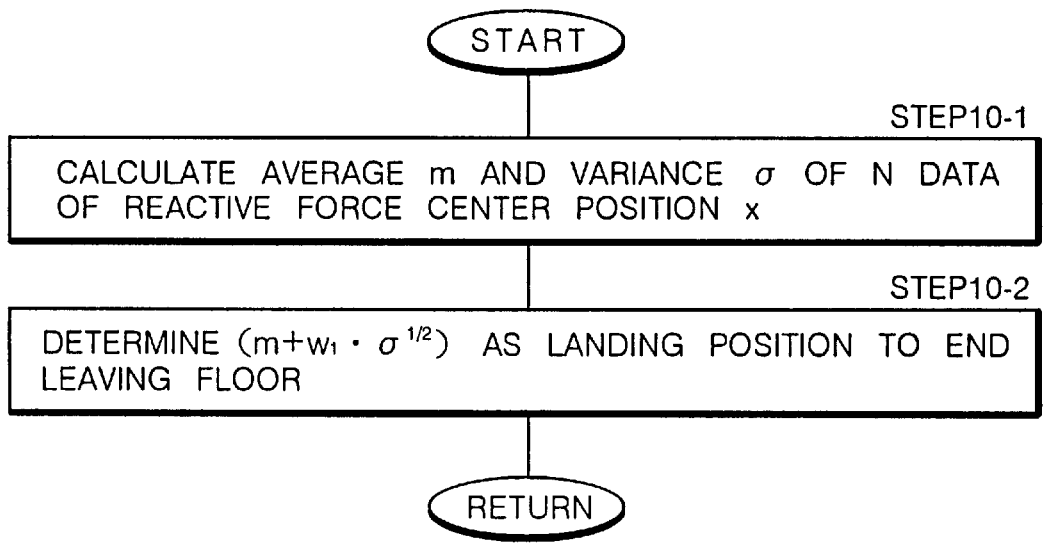

ASCENDING

AT START TO
TOUCH FLOOR
(t=tut)

ASCENDING

SINGLE SUPPORT PHASE
(tut<t<tul)

ASCENDING

AT END TO
LEAVE FLOOR
(t=tul)

FIG. 13A DESCENDING
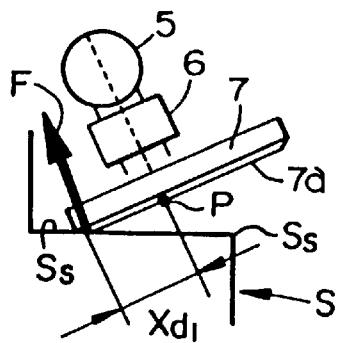
AT START TO TOUCH FLOOR ($t=t_{dt}$)
FIG. 13B DESCENDING
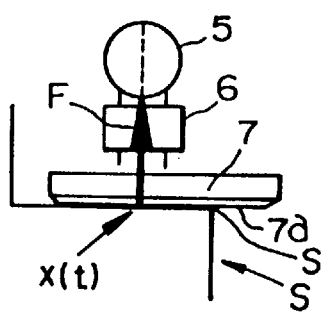
SINGLE SUPPORT PHASE ($t_{dt} < t < t_{dl}$)
FIG. 13C DESCENDING
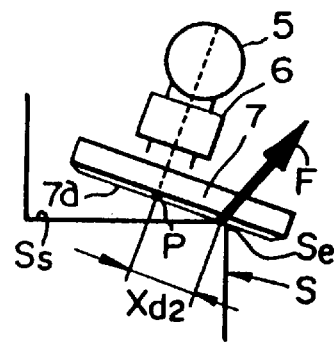
AT END TO LEAVE FLOOR ($t=t_{dl}$)
FIG. 14
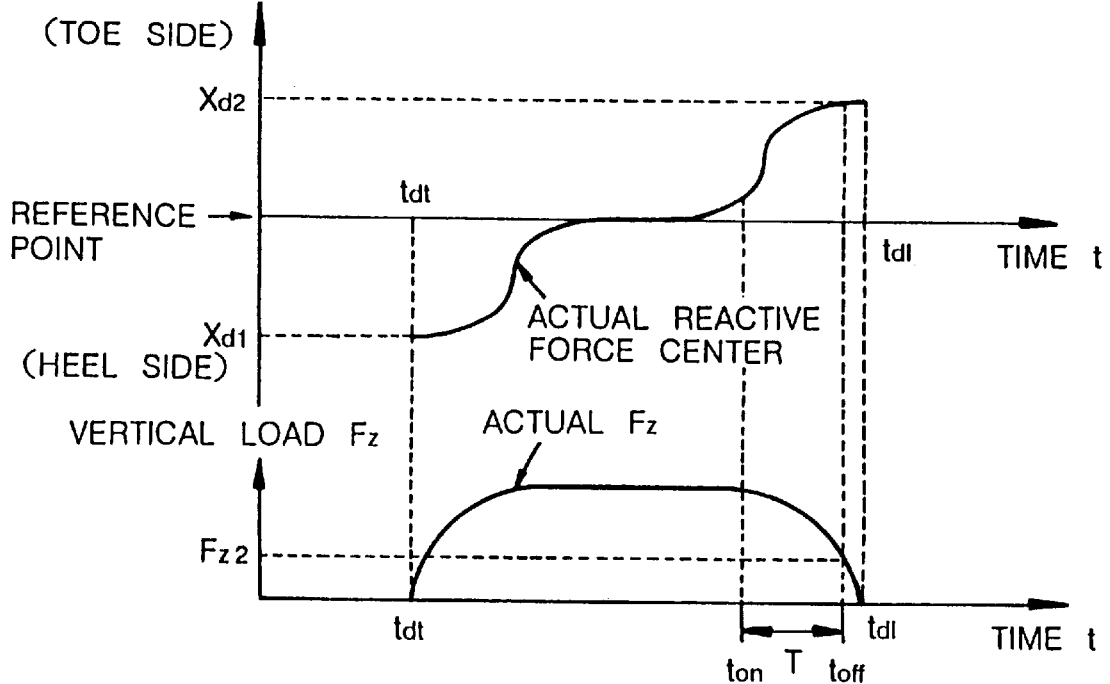

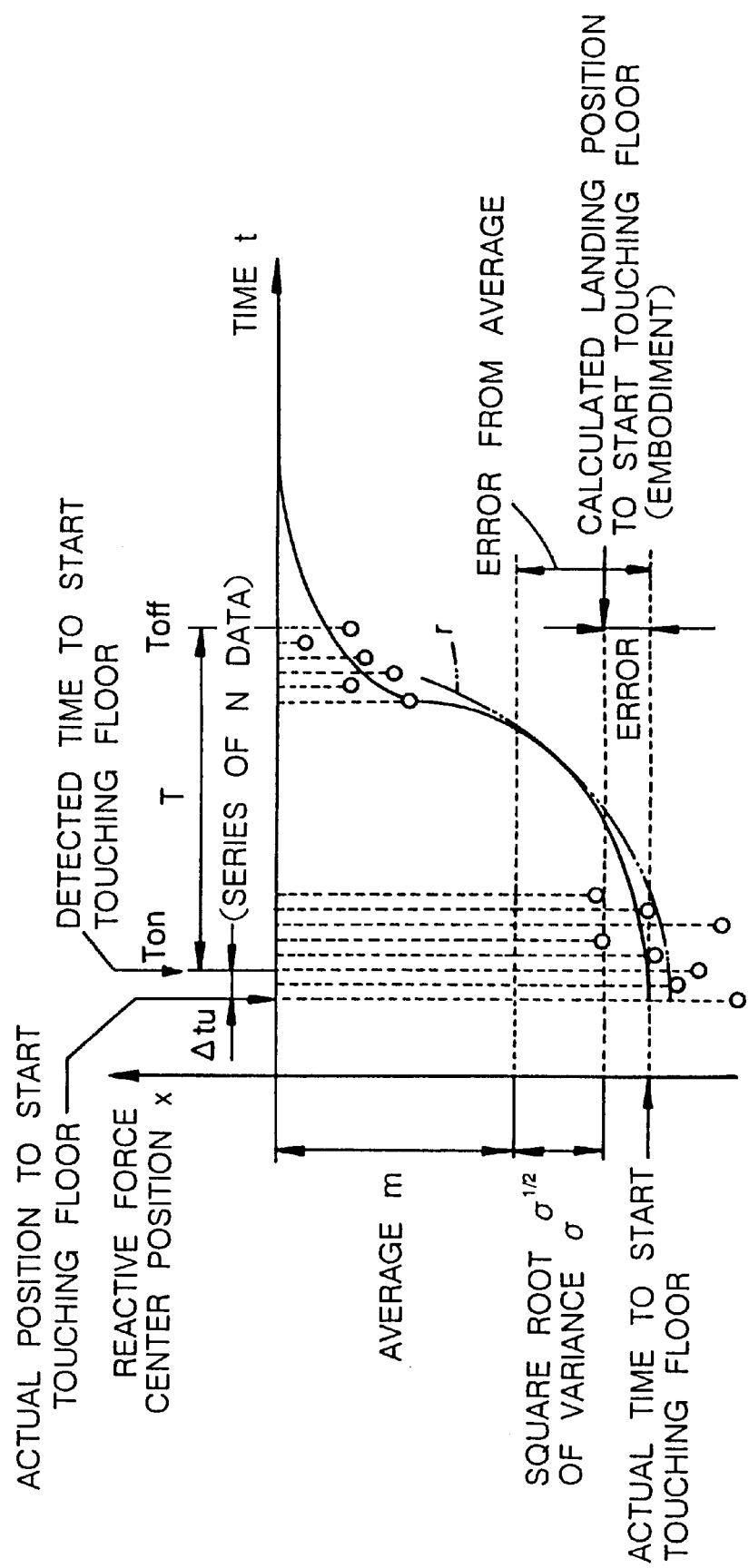
FIG. 15 ASCENDING

1

APPARATUS FOR DETECTING THE LANDING POSITION OF FOOT SOLE OF LEGGED MOVING ROBOT

BACKGROUND OF THE INVENTION

1. Field of the Invention

The present invention relates to a legged moving robot, and more particularly to an apparatus for detecting the landing position of a foot sole of a legged moving robot at the time the foot sole touches or leaves a floor when the legged moving robot moves up or down a stair or the like.

2. Description of the Prior Art

When legged moving robots such as two-legged walking robots move up or down a stair or on a rough surface, it is desirable to detect the landing position of foot soles of movable legs, i.e., the position of a region of a foot sole which contacts a floor, for enabling the robots to move stably. In particular, it is desirable to detect the landing position of a foot sole when the foot sole touches or leaves a floor.

Specifically, when a two-legged walking robot ascends along a stair with a certain gait (a walking pattern such as a stride), if the landing position of the foot sole of one movable leg at the time the movable leg touches a stair step is too close to the toe, then the other movable leg may possibly miss an upper stair step with the present gait when the other movable leg attempts to reach the upper stair step. Therefore, it is necessary to correct the gait of the robot, e.g., increase the stride, if the landing position is too close to the toe. Similarly, when the two-legged walking robot descends along a stair with a certain gait, if the landing position of the foot sole of one movable leg at the time the movable leg touches a stair step is too close to the heel, then the other movable leg may possibly miss a lower stair step with the present gait when the other movable leg attempts to reach the lower stair step. Therefore, it is also necessary to correct the gait of the robot, e.g., reduce the stride, if the landing position is too close to the heel.

It is thus desirable to detect the landing position of a foot sole when the foot sole touches or leaves a floor in order to correct the gait of the robot.

Prior arrangements for detecting the landing position of a foot sole when the robot moves are disclosed in Japanese laid-open patent publication No. 3-184781 (U.S. Pat. No. 5,255,753) and Japanese laid-open patent publication No. 7-205085 (U.S. patent application Ser. No. 08/363,497).

According to the disclosure of Japanese laid-open patent publication No. 3-184781 (U.S. Pat. No. 5,255,753), as shown in FIGS. 22 through 25 thereof, a matrix of contact sensors are mounted on the foot sole of a movable leg, and output signals from the sensors are processed to recognize a distribution of loads imposed on the foot sole for thereby detecting the landing position of the foot sole.

Japanese laid-open patent publication No. 7-205085 (U.S. patent application Ser. No. 08/363,497) reveals reflective light sensors disposed on respective opposite sides of a robot foot. Based on output signals from the light sensors, the edge of a stair step which contacts the foot sole is recognized to detect the landing position of the foot sole with respect to the stair step.

With the former prior art, since the contact sensors are mounted on the foot sole, the contact sensors are liable to be damaged due to impacts acting on the foot sole when the foot sole touches a floor during movement of the robot. If the contact sensors are covered with an elastic material such as rubber for protection against damage, then the contact sensors are unable to accurately detect a distribution of loads applied to the foot sole. Furthermore, since many contact sensors are employed, a lot of processing operation is needed to process the output signals from the contact sensors.

The light sensors according to the latter prior art are less likely to be damaged or broken. However, in order to prevent the light sensors from being affected by stains on a floor or stair steps, reflecting tapes (markers) need to be applied the floor or the stair steps, resulting in an increase in the cost of the robot. Even if reflecting tapes are employed, the light sensors may accurately detect the reflecting tapes when they are stained.

SUMMARY OF THE INVENTION

It is therefore an object of the present invention to provide an apparatus which is of a relatively simple arrangement for accurately detecting, through a simple processing operation, the landing position of a foot sole when a movable leg of a legged moving robot touches or leaves a floor, while being free of the effect of stains on the floor and avoiding damage to a sensor.

To achieve the above object, there is provided in accordance with a first aspect of the present invention an apparatus for detecting the landing position of a foot sole of a legged moving robot when each of movable legs of the legged moving robot touches a floor, i.e., starts touching the floor. The legged moving robot has a plurality of movable legs for repeatedly touching and leaving a floor. The apparatus comprises a force sensor mounted on each of the movable legs at a position spaced from a foot sole thereof toward a proximal end thereof, for detecting at least a perpendicular force perpendicular to the foot sole and a moment about an axis extending in a lateral direction of the foot sole and passing through a predetermined reference point on the foot sole, and means for detecting a time when the foot sole touches the floor based on the perpendicular force detected by the force sensor, and a landing position for the foot sole to start touching the floor based on the perpendicular force and the moment detected by the force sensor, at the detected time or in a predetermined time range near the detected time.

To achieve the above object, there is provided in accordance with a second aspect of the present invention an apparatus for detecting the lift-off position of a foot sole of a legged moving robot when each of movable legs of the legged moving robot leaves a floor, i.e., ends leaving the floor. The legged moving robot has a plurality of movable legs for repeatedly touching and leaving a floor. The apparatus comprises a force sensor mounted on each of the movable legs at a position spaced apart from a foot sole, for detecting at least a perpendicular force perpendicular to the foot sole and a moment about an axis extending in a lateral direction of the foot sole and passing through a predetermined reference point on the foot sole, and means for detecting a time when the foot sole leaves the floor based on the perpendicular force detected by the force sensor, and a lift-off position or a landing position for the foot sole to end leaving the floor based on the perpendicular force and the moment detected by the force sensor, at the detected time or in a predetermined time range near the detected time.

According to the first and second aspects of the present invention, when each of the movable legs which has left the floor touches the floor, the foot sole thereof is abruptly subjected to a reactive force from the floor, and when each of the movable legs which has touched the floor leaves the floor, the foot sole thereof is abruptly released from a reactive force from the floor. Therefore, the touching of the floor by the foot sole or the leaving from the floor by the foot sole can be detected on the basis of the perpendicular force acting perpendicularly to the foot sole. According to findings of the inventors, when the foot sole touches or leaves the floor, the distance from a reference point on the foot sole to a region of the foot sole which contacts the floor, i.e., the center of the reactive force applied to the foot sole from the floor, is correlated to the perpendicular force and the moment which are detected by the force sensor. Therefore, it is possible to detect the landing position for the foot sole to start touching the floor based on the perpendicular force and the moment detected by the force sensor, at the detected time or in a predetermined time range near the detected time. Similarly, it is also possible to detect the landing position for the foot sole to end leaving the floor based on the perpendicular force and the moment detected by the force sensor, at the detected time or in a predetermined time range near the detected time.

According to the first and second aspects of the present invention, because the landing position for the foot sole to start touching the floor and the landing position for the foot sole to end leaving the floor are determined using the detected values from the force sensor, the detection of the landing positions is not affected by stains on the floor. Since the force sensor is spaced from the foot sole, the force sensor is kept out of direct contact with the floor and hence protected against damage when the foot sole touches the floor. Furthermore, only the perpendicular force and the moment may be detected for determining the landing position for the foot sole to start touching the floor and the landing position for the foot sole to end leaving the floor. Consequently, the landing position for the foot sole to start touching the floor and the landing position for the foot sole to end leaving the floor can be determined through simple calculations. The force sensor may comprise a known six-axis force sensor.

According to the present invention, therefore, the apparatus is of a relatively simple arrangement, and can accurately detect, through a simple processing operation, the landing position of the foot sole when each movable leg touches or leaves the floor, while being free of the effect of stains on the floor and avoiding damage to the force sensor.

According to the first aspect of the present invention, the time the foot sole touches the floor is detected when the perpendicular force detected by the force sensor increases to a predetermined value. According to the second aspect of the present invention, the time the foot sole leaves the floor is detected when the perpendicular force detected by the force sensor decreases to a predetermined value. The touching of the floor by the foot sole and the leaving from the floor by the foot sole can thus be detected with ease.

According to the first aspect of the present invention, the means may comprise means for determining, from time to time, a central position of a reactive force applied from the floor to the foot sole under the perpendicular force and the moment detected by the force sensor, and determining the landing position for the foot sole to start touching the floor based on the central position determined at the detected time or in the predetermined time range near the detected time. Similarly, according to the second aspect of the present invention, the means may comprise means for determining, from time to time, a central position of a reactive force applied from the floor to the foot sole under the perpendicular force and the moment detected by the force sensor, and determining the landing position for the foot sole to end leaving the floor based on the central position determined at the detected time or in the predetermined time range near the detected time.

The region of the foot sole which contacts the floor when the foot sole touches or leaves the floor is the central position of the reactive force imposed on the foot sole from the floor. By determining, from time to time, the central position from the perpendicular force and the moment, the landing position for the foot sole to start touching the floor can immediately be recognized on the basis of the central position determined at the detected time or in the predetermined time range near the detected time, and likewise, the landing position for the foot sole to end leaving the floor can immediately be recognized on the basis of the central position determined at the detected time or in the predetermined time range near the detected time.

The central position at the time when the touching of the floor by the foot sole and the leaving from the floor by the foot sole are detected may be determined directly as the landing position for the foot sole to start touching the floor and the landing position for the foot sole to end leaving the floor. However, according to the first aspect of the present invention, it is preferable to determine the landing position for the foot sole to start touching the floor based on a time series of data of the central position which are determined from the detected time until a predetermined time, and according to the second aspect of the present invention, it is preferable to determine the landing position for the foot sole to end leaving the floor based on a time series of data of the central position which are determined from the detected time until a predetermined time.

Specifically, the detected values from the force sensor at the instant the foot sole touches or leaves the floor tends to suffer variations, and the central position determined from the detected values is also liable to suffer fluctuations. When the foot sole touches the floor, the landing position for the foot sole to start touching the floor based on a time series of data of the central position which are determined from the detected time until a predetermined time, and when the foot sole leaves the floor, the landing position for the foot sole to end leaving the floor based on a time series of data of the central position which are determined from the detected time until a predetermined time. In this manner, the landing position for the foot sole to start touching the floor and the landing position for the foot sole to end leaving the floor can be determined statistically accurately while eliminating the effect of erroneous detected values from the force sensor.

According to findings of the inventors, for determining the landing position for the foot sole to start touching the floor and the landing position for the foot sole to end leaving the floor using the time series of data of the central position, the sum of an average value of the time series of data of the central position and the square root of a variance of the time series of data of the central position or the product of the square root and a predetermined corrective coefficient may be determined as these landing positions. In this fashion, the accuracy of the landing position for the foot sole to start touching the floor and the landing position for the foot sole to end leaving the floor may be increased.

Alternatively, according to the first aspect of the present invention, the means may comprise means for determining a polynomial which approximates a time-dependent change of the central position from the time series of data of the central position according to a method of least squares, estimating the central position at a time spaced from the detected time by a predetermined time interval according to the polynomial, and producing the estimated central position as the landing position for the foot sole to start touching the floor. According to the second aspect of the present invention, the means may comprise means for determining a polynomial which approximates a time-dependent change of the central position from the time series of data of the central position according to a method of least squares, estimating the central position at a time spaced from the detected time by a predetermined time interval according to the polynomial, and producing the estimated central position as the landing position for the foot sole to end leaving the floor.

Specifically, the time at which the foot sole touches the floor, detected on the basis of the perpendicular force, is considered to be slightly later than the time of the instant the movable leg actually starts touching the floor (the instant the foot sole touches the floor), i.e., the time at which the foot sole actually starts touching the floor. Similarly, the time at which the foot sole leaves the floor, detected on the basis of the perpendicular force, is considered to be slightly earlier than the time of the instant the movable leg actually leaves the floor (the instant the foot sole leaves the floor), i.e., the time at which the foot sole actually ends leaving the floor. According to the first aspect of the present invention, the central position at a time spaced from the detected time by a predetermined time interval is estimated by the polynomial which is determined from the time series of data of the central position from the time the touching of the floor by the foot sole is detected until the predetermined time, so that the central position can be recognized at the actual time the foot sole starts touching the floor. When the estimated central position is used as the landing position for the foot sole to start touching the floor, the accuracy of the landing position for the foot sole to start touching the floor is increased.

According to the second aspect of the present invention, the central position at a time spaced from the detected time by a predetermined time interval is estimated by the polynomial which is determined from the time series of data of the central position from the time the leaving from the floor by the foot sole is detected until the predetermined time, so that the central position can be recognized at the actual time the foot sole leaves the floor. When the estimated central position is used as the landing position for the foot sole to end leaving the floor, the accuracy of the landing position for the foot sole to end leaving the floor is increased.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 9 is a flowchart of a data processing subroutine in the main routine shown in FIG. 8;

FIG. 10 is a flowchart of another data processing subroutine in the main routine shown in FIG. 8;

FIGS. 13A, 13B, 13C are side elevational views showing a floor touching action of the legged moving robot shown in FIGS. 1 and 2 as it descends along a stair;

FIG. 14 is a diagram illustrative of processing operation of the controller shown in FIG. 7; and FIG. 15 is a diagram illustrative of processing operation of the controller shown in FIG. 7.

DETAILED DESCRIPTION OF THE PREFERRED EMBODIMENTS

Figure 1:
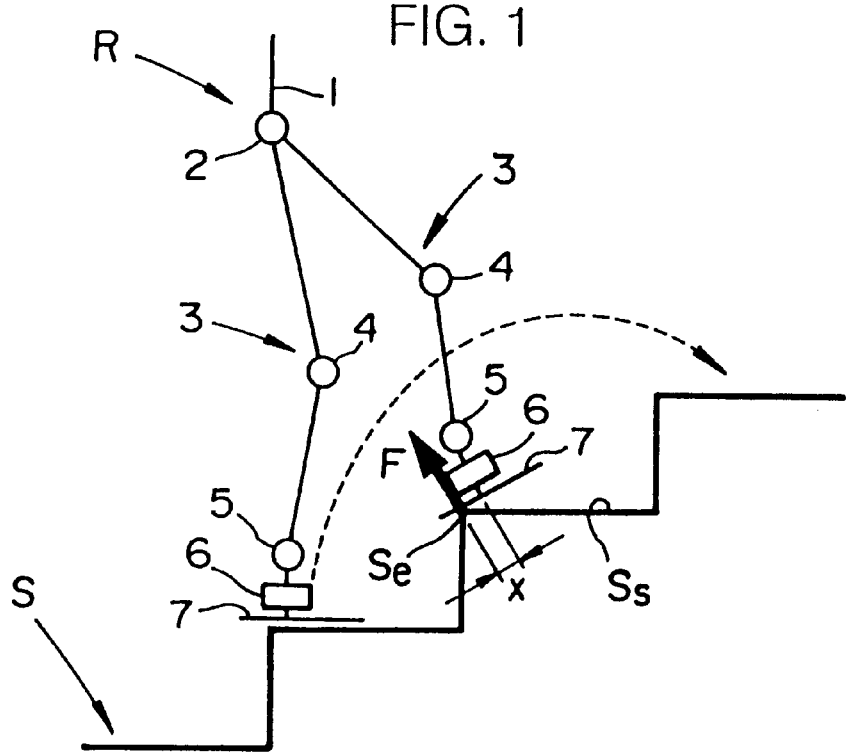
FIG. 1 is a schematic side elevational view showing the manner in which a legged moving robot ascends along a stair.

A first embodiment of the present invention will be described below with reference to FIGS. 1 through 6.

A legged moving robot which incorporates an apparatus for detecting the landing position of a foot sole according to the present invention will first be described below with reference to FIGS. 1 through 3. The legged moving robot is commonly used in first and second embodiments of the present invention.

The legged moving robot comprises a two-legged walking robot R having two movable legs 3 extending from a thigh joint 2 at a lower end of a body 1. The movable legs 3, which are of an identical structure, each have a knee joint 4 in an intermediate position thereof and an ankle joint 5 in a lower position thereof. A substantially planar foot 7 is attached to a lower end of the ankle joint 5 of each of the legs 3 by a six-axis force sensor 6. The foot 7 has a foot sole 7a to which a resilient member 8 (see FIG. 3) such as of rubber is attached.

The joints 2, 4, 5 can be bent or angularly moved by actuators such as motors (not shown).

Figure 3:
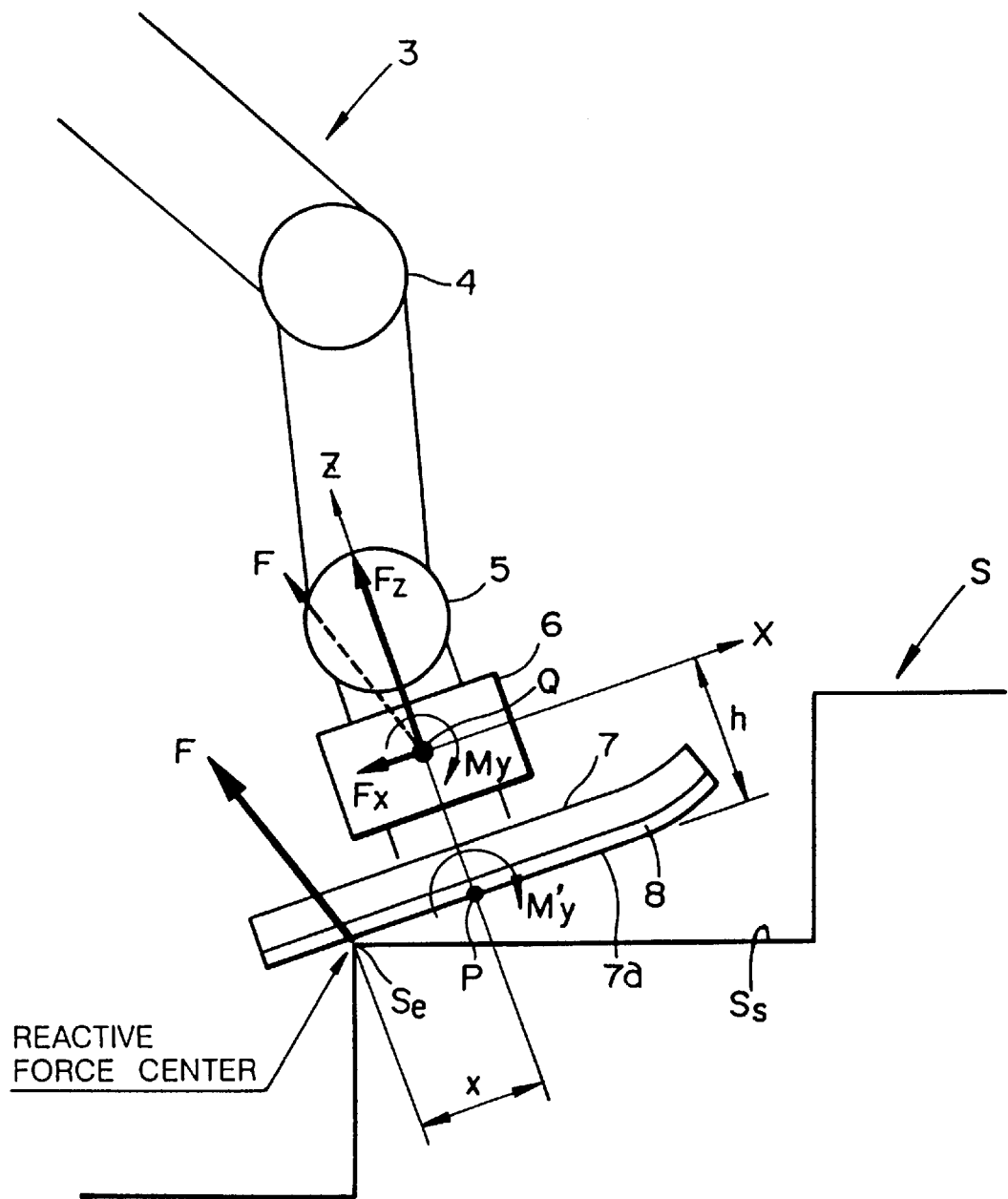
FIG. 3 is an enlarged fragmentary side elevational view of the legged moving robot as it ascends along the stair.

As shown in FIG. 3, the six-axis force sensor 6, which is of a known structure, is mounted for movement in unison with the foot 7 at a position located between the ankle joint 5 and the foot 7 and spaced a distance h from the foot sole 7a toward the ankle joint 5. When the robot R moves (walks), the six-axis force sensor 6 detects force components along three axes (spatial orthogonal coordinate axes) of a force which is applied to the six-axis force sensor 6 under a reactive force F from a floor (a stair step Ss or a stair step edge Se of a stair S), and also detects moments generated about those axes at a detection reference point Q of the six-axis force sensor 6 under the applied force. The six-axis force sensor 6 produces output signals representative of the detected force components and moments. The detection reference point Q of the six-axis force sensor 6 is peculiar to the six-axis force sensor 6. The six-axis force sensor 6 detects force components and moments which act on the detection reference point Q.

Specifically, as shown in FIG. 3, the six-axis force sensor 6 is associated with a spatial orthogonal coordinate system which has an X-axis extending in the longitudinal direction of the foot 7, a Y-axis (not shown) extending in the transverse direction (normal to the sheet of FIG. 3), and a Z-axis perpendicularly to the foot sole 7a of the foot 7. The six-axis force sensor 6 produces output signals depending on force components Fx, Fy, Fz (only Fx, Fz shown in FIG. 3) applied respectively along the X-, Y-, Z-axes to the six-axis force sensor 6 under the reactive force F, and moments Mx, My, Mz (only My shown in FIG. 3) generated respectively about the X-, Y-, Z-axes. The Z-axis extends through the detection reference point Q of the six-axis force sensor 6, and the force component Fz acts perpendicular to the foot sole 7a.

Figure 4:
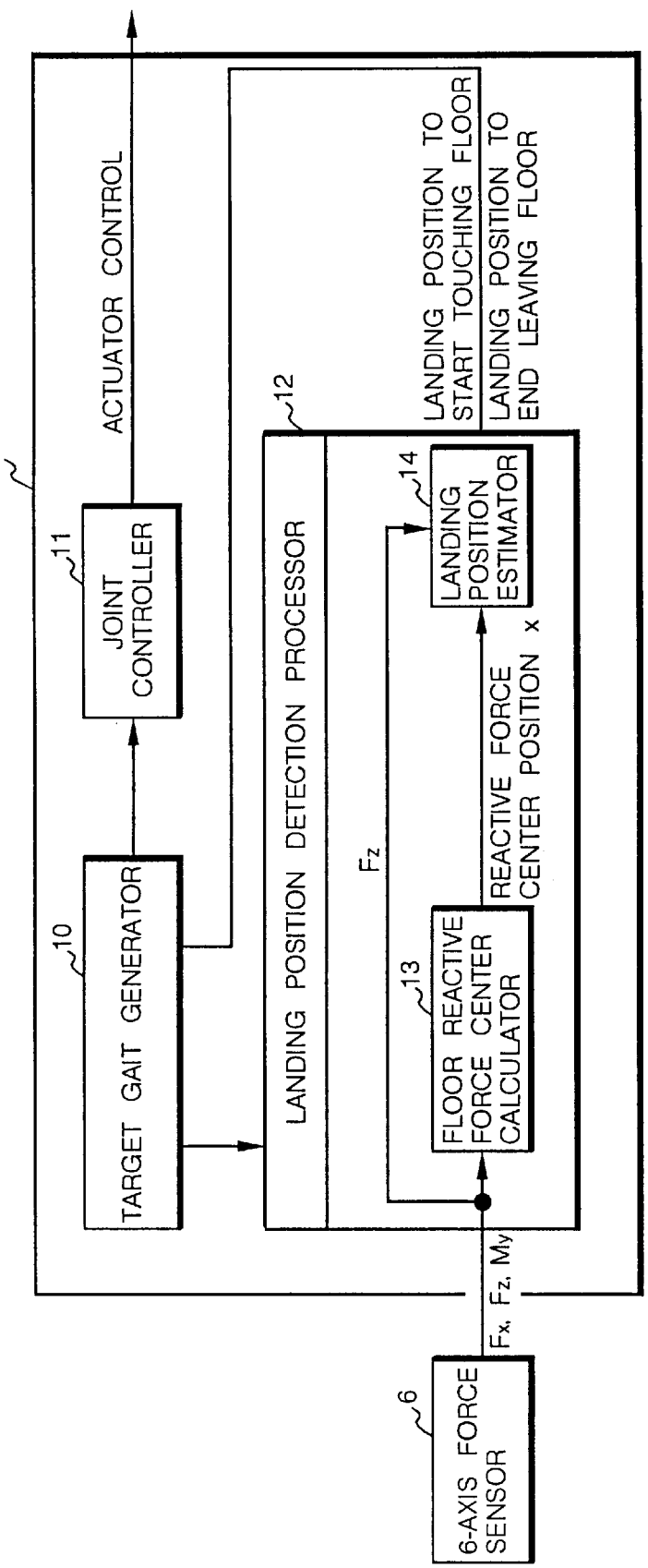
FIG. 4 is a block diagram of a controller according to a first embodiment of the present invention, which is installed on the legged moving robot shown in FIGS. 1 and 2.

According to the first embodiment of the present invention, as shown in FIG. 4, the robot R has a controller 9 which comprises a microcomputer for controlling the walking movement of the robot R. The controller 9 has, as its functions, a target gait generator 10 for generating a target gait, indicative of a walking pattern including a stride, a foot motion, etc., for each of the movable legs 3 and calculating target joint angles (target values for bending angles for the joints 2, 4, 5) for the joints 2, 4, 5 depending on the generated target gait, a joint controller 11 for controlling the joints 2, 4, 5 with actuators (not shown) according to the target joint angles, and a landing position detection processor 12 for determining a landing position to start touching a floor, of the foot sole 7a when the foot 7 touches the floor, i.e., the position of a portion of the foot sole 7a which first contacts a stair step Ss or a stair step edge Se of the stair S, and also determining a landing position to end leaving a floor, of the foot sole 7a when the foot 7 leaves the floor, i.e., the position of a portion of the foot sole 7a which finally leaves a stair step Ss or a stair step edge Se of the stair S. The target gait generator 10, the joint controller 11, and the landing position detection processor 12 are associated with each of the movable legs 3.

Figure 2:
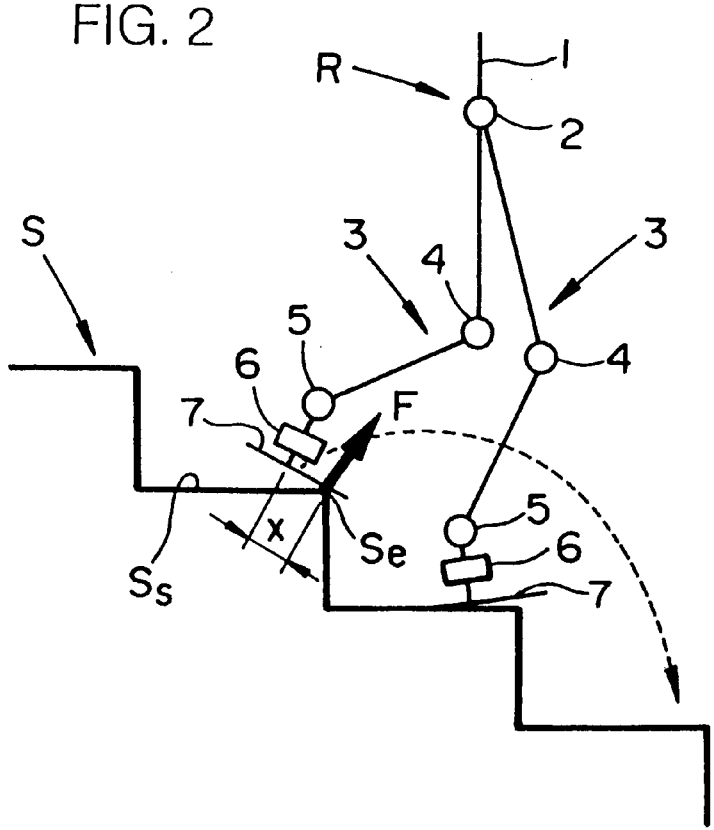
FIG. 2 is a schematic side elevational view showing the manner in which the legged moving robot ascends along a stair.

The target gait generator 10 basically generates a target gait for controlling the movable leg 3, just as a human leg, such that the foot 7 starts touching a floor from the heel, then the foot sole 7a touches the floor from the heel to the toe, and thereafter the foot 7 starts leaving the floor from the heel, and finally the toe of the foot 7 leaves the floor (see FIGS. 1 and 2). When the robot R ascends the stair S, as shown in FIG. 1, the target gait generator 10 generates a target gait such that the heel of the foot 7 is positioned slightly off and projects beyond an edge Se of the stair S. When the robot R descends the stair S, as shown in FIG. 2, the target gait generator 10 generates a target gait such that the toe of the foot 7 is positioned slightly off and projects beyond an edge Se of the stair S. Therefore, the target gait is generated for the foot sole 7a to touch an edge Se in line-to-line contact when the foot sole 7a starts to touch the stair S upon ascending along the stair S, and for the foot sole 7a to touch an edge Se in line-to-line contact when the foot sole 7a starts to leave the stair S upon descending along the stair S.

The landing position detection processor 12 comprises a floor reactive force center calculator 13 for calculating, from time to time according to a predetermined formula, a central position of a reactive force (hereinafter referred to as a "reactive force center") applied from the floor (a stair step Ss or a stair edge Se) to the foot sole 7a, from the force components Fx, Fz and the moment My detected by the six-axis force sensor 6, and a landing position estimator 14 for estimating the landing position for the foot sole 7a to start touching the floor and the landing position for the foot sole 7a to end leaving the floor, based on the calculated reactive force center and the force component Fz detected by the six-axis force sensor 6.

Prior to describing the floor reactive force center calculator 13 and the landing position estimator 14 in detail, the principles of detection of the landing position to start touching the floor and the landing position to end leaving the floor according to the present invention will be described below.

In FIG. 3, at the time the robot 3 ascends along the stair S, for example, when the foot sole 7a starts touching the stair S from the stair edge Se onto the stair step Ss according to the above gait, the center of the reactive force F, i.e., the reactive force center, which is applied from the stair S to the foot sole 7a is located at the position where the foot sole 7a contacts the stair edge Se, which position is the landing position to start touching the floor described above. Similarly, at the time the robot 3 descends along the stair S, for example, when the foot sole 7a starts leaving the stair S, the center of the reactive force F, i.e., the reactive force center, which is applied from the stair S to the foot sole 7a is located at the position where the foot sole 7a contacts the stair edge Se, which position is the landing position to end leaving the floor described above (see FIG. 2). Therefore, the landing position to start touching the floor and the lift-off or landing position to end leaving the floor for the foot sole 7a can be determined from the position of the center of the reactive force applied to the foot sole 7a when the foot sole 7a starts touching the floor and ends leaving the floor.

When the foot 7 starts touching the floor, as shown in FIG. 3, it is assumed that a point where the foot sole 7a crosses the Z-axis, which point is positioned directly below the detection reference point Q of the six-axis force sensor 6, is defined as a reference point P and a moment generated about an axis passing through the reference point P parallel to the Y-axis, which axis passes the reference point P perpendicularly to the sheet of FIG. 3, is represented resented by M'y. The moment M'y is expressed according to the following equation (1):

$$M'y = My + Fx \cdot h \quad (1)$$

where Fx is the force component detected along the X-axis by the six-axis force sensor 6, My the moment about the Y-axis, and h the distance from the foot sole 7a to the detection reference point Q of the six-axis force sensor 6.

The force component Fx along the X-axis is positive in the direction indicated by the arrow on the X-axis in FIG. 3, i.e., the forward direction of the movable leg 3. Therefore, Fx<0 in FIG. 3. The moment M'y is positive in the direction indicated by the arrow in FIG. 3. Therefore, the moment M'y is positive in FIG. 3.

The moment M'y about the reference point P is expressed according to the following equation (2):

$$M'y = -Fz \cdot x \quad (2)$$

where Fz is the force component detected along the Z-axis by the six-axis force sensor 6, i.e., the force component of the reactive force F along the Z-axis, and x the distance from the reference point P to the reactive force center of the foot sole 7a, (x is an X-axis coordinate of the reactive force center and x<0 in FIG. 3).

The force component Fz is positive in the direction indicated by the arrow on the Z-axis, i.e., in the upward direction.

From the equations (1), (2), the distance x is determined according to the following equation (3):

$$x = -M'y/Fz = -(My + Fx \cdot h)/Fz \quad (3)$$

Although not described in detail, the equation (3) can also be obtained with respect to the reactive force center when the foot sole 7a ends leaving the floor at the time the robot R descends along the stair S.

Therefore, the position of the reactive force center when the foot sole 7a starts touching the floor at the time the robot R ascends along the stair S, and the position of the reactive force center when the foot sole 7a ends leaving the floor at the time the robot R descends along the stair S can be determined as the distance x from the reference point P along the X-axis, i.e., the X-axis coordinate of the reactive force center (referred to as a "reactive force center position x") according to the above equation (3) based on the force components Fx, Fz and the moment My which are detected by the six-axis force sensor 6 at the time. If the detected signals from the six-axis force sensor 6 are free of noise, then the positions of the reactive force centers determined by the equation (3) when the foot sole 7a starts touching the floor and ends leaving the floor, is indicative of the landing position to start touching the floor and the landing position to end leaving the floor. In this manner, the landing position to start touching the floor and the landing position to end leaving the floor can be detected.

The landing position to start touching the floor and the landing position to end leaving the floor are representative of the position of the stair edge Se with respect to the reference point P on the foot sole 7a when the foot sole 7a starts touching the floor and ends leaving the floor, respectively.

Based on the above principles, the floor reactive force center calculator 13 determines the reactive force center position x, from time to time, according to the equation (3) based on the force components Fx, Fz and the moment My which are detected by the six-axis force sensor 6 from time to time. Stated otherwise, the floor reactive force center calculator 13 determines the moment M'y according to the equation (1) based on the force component Fx and the moment My and then determines the reactive force center position x according to the equation (3) based on the moment M'y and the force component Fz.

It is possible to establish the detection reference point Q of the six-axis force sensor 6 at or near the reference point P on the foot sole 7a. In this case, the distance h from the detection reference point Q to the foot sole 7a is nil, and the term "Fx·h" in the equation (3) is ignored and M'y=My in the equation (1). Therefore, the reactive force center position x can be determined according to the following equation (4), rather than the equation (3):

$$x = -My/Fz \quad (4)$$

The force component Fx along the X-axis is no longer necessary.

The landing position estimator 14 detects the time for the foot sole 7a to start touching the floor or end leaving the floor when the robot R ascends along the stair S based on the force component Fz detected by the six-axis force sensor 6 from time to time (as described later on), and estimates the reactive force center position x which is calculated by the floor reactive force center calculator 13 at the detected time, as the landing position to start touching the floor and the landing position to end leaving the floor.

Operation of the robot R as it walks, particularly, as it ascends and descends along the stair S, according to the first embodiment of the present invention will be described below with reference to FIGS. 5 and 6.

Figure 5:
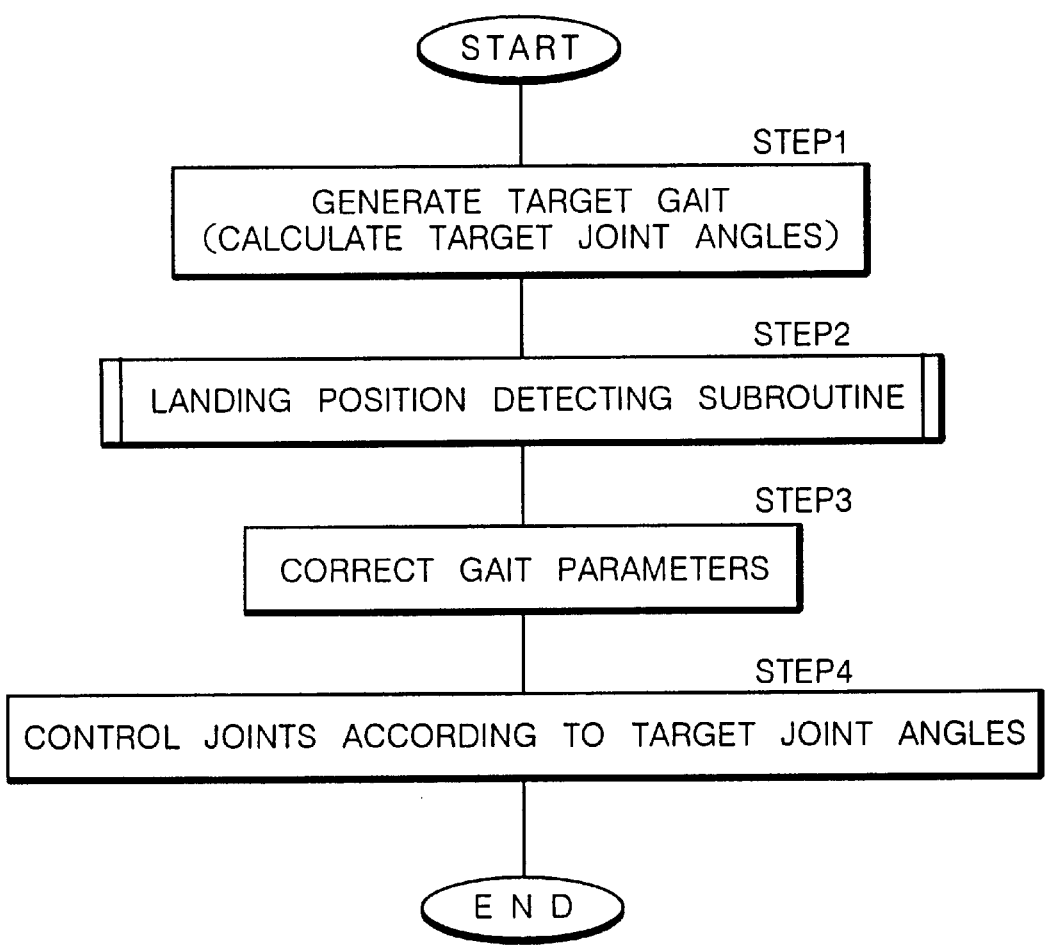
FIG. 5 is a flowchart of a main routine of the controller shown in FIG. 4.

When the robot R walks, the controller 9 executes a main routine as shown in FIG. 5 in predetermined cycle times.

The target gait generator 10 generates a target gait for each of the movable legs 3 and calculates target joint angles for the respective joints 2, 4, 5 depending on the target gait in STEP1.

Then, the landing position detection processor 12 executes a landing position detecting subroutine for detecting a landing position to start touching a floor and a landing position to end leaving a floor, of the foot sole 7a of each of the movable legs 3 in STEP2.

Figure 6:
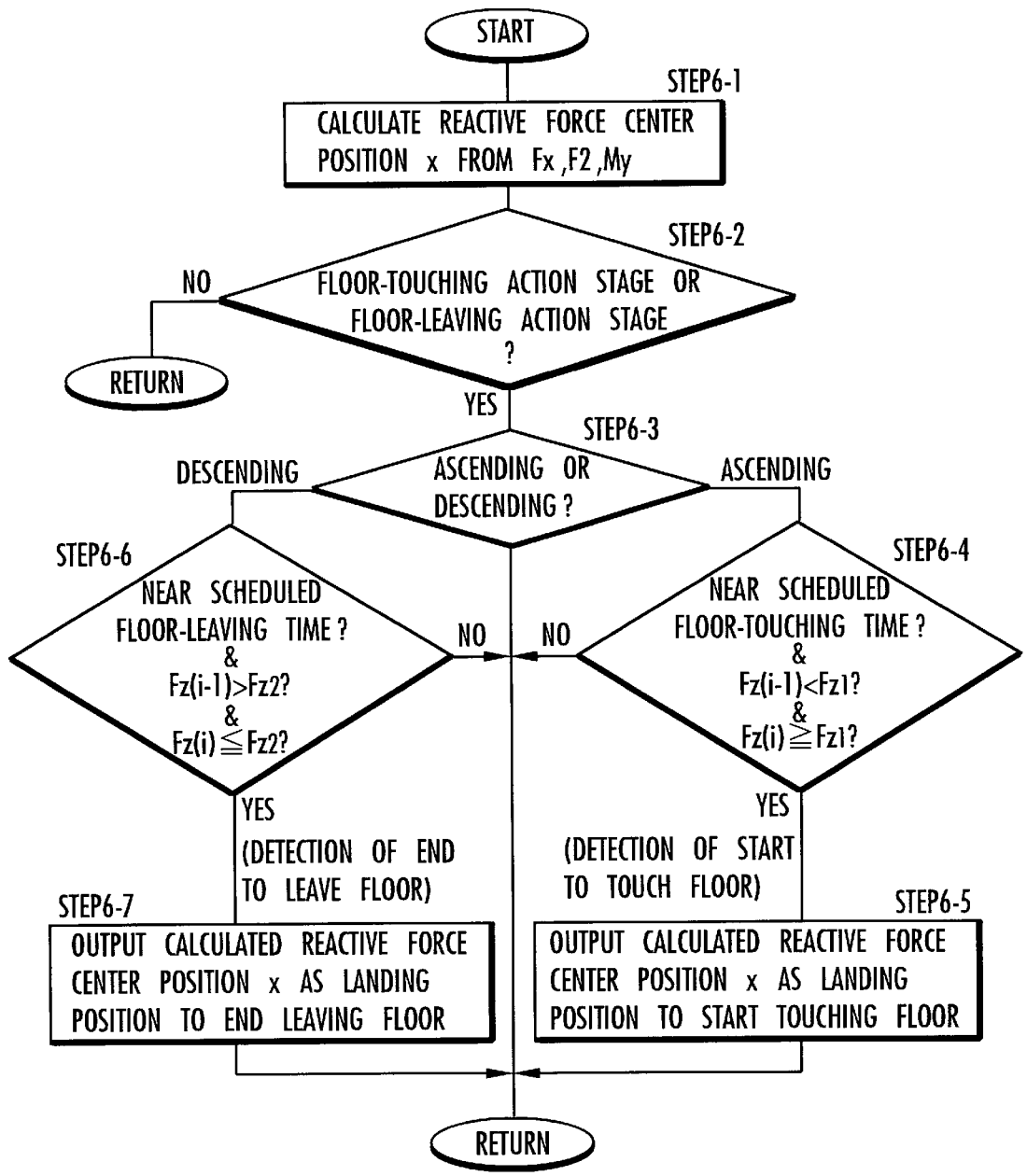
FIG. 6 is a flowchart of a landing position detecting subroutine in the main routine shown in FIG. 5.

The landing position detecting subroutine is illustrated in FIG. 6.

The floor reactive force center calculator 13 calculates a reactive force center position x for each of the movable legs 3 according to the equation (3) based on the force components Fx, Fz and the moment My which are detected by the six-axis force sensor 6 of each of the movable legs 3 at the present time in STEP 6-1. Alternatively, if the detection reference point Q of the six-axis force sensor 6 is established at the foot sole 7a, then the floor reactive force center calculator 13 calculates a reactive force center position x according to the equation (4) based on the force component Fz and the moment My.

Then, the landing position detection processor 12 ascertains whether the foot 7 of each of the movable legs 3 is presently in an action stage to start touching a floor or in an action stage to end leaving a floor, depending on the target gait given by the target gait generator 10 in STEP6-2. If the foot 7 is not in each of the above action stages, then control returns from the subroutine to the main routine shown in FIG. 5.

If the foot 7 is in either one of the above action stages, then the landing position detection processor 12 ascertains whether the robot R is ascending or descending along a stair S depending on the target gait in STEP6-3. If the robot R is neither ascending nor descending, i.e., if the robot R is walking on plain terrain, then control returns from the subroutine to the main routine shown in FIG. 5.

If the robot R is ascending along a stair S, then the landing position estimator 14 of the landing position detection processor 12 which corresponds to the movable leg 3 in the action stage to start touching the floor (hereinafter referred to as a "floor-touching movable leg 3") ascertains whether the present time detected by a timer (not shown) is close to a scheduled floor-touching time determined for the floor-touching movable leg 3 from the target gait, a force component Fz(i–1) (i represents the number of a present cycle time) detected along the Z-axis by the six-axis force sensor 6 of the floor-touching movable leg 3 in a preceding cycle time is smaller than a predetermined setting Fz1 which is preset as the force component Fz generated when the foot 7 starts touching the floor, and a force component Fz(i) detected along the Z-axis by the six-axis force sensor 6 of the floor-touching movable leg 3 in the present cycle time is equal to or greater than the predetermined setting Fz1, for thereby ascertaining whether the foot 7 of the floor-touching movable leg 3 has started touching the floor in STEP6-4 (detection of the time to start touching the floor). If the conditions in STEP6-4 are not satisfied (the foot 7 has not started touching the floor), then control returns from the subroutine to the main routine shown in FIG. 5. If the conditions in STEP6-4 are satisfied (the foot 7 has started touching the floor), then the landing position estimator 14 outputs the reactive force center position x calculated with respect to the floor-touching movable leg 3 in STEP6-1 as the landing position for the foot sole 7a to start touching the floor, i.e., the position of the stair edge Se with respect to the foot sole 7a when the foot sole 7a starts touching the floor, to the target gait generator 10 in STEP6-5. Thereafter, control returns from the subroutine to the main routine shown in FIG. 5.

When the foot 7 of the floor-touching movable leg 3 starts touching the floor after it has not touched the floor, since the reactive force F is abruptly applied to the foot sole 7a which has been free of the reactive force F, the conditions $Fz(i-1)<Fz1$ and $Fz(i) \geq Fz1$ are satisfied in STEP6-4, it can basically be determined that the foot 7 has started touching the floor. However, because conditions $Fz(i-1)<Fz1$ and $Fz(i) \geq Fz1$ may be satisfied when the foot 7 touches foreign matter, the condition as to whether the present time is near the scheduled floor-touching time is added in STEP6-4 for thereby detecting the time to start touching the floor more reliably.

If the robot R is descending along a stair S, then the landing position estimator 14 of the landing position detection processor 12 which corresponds to the movable leg 3 that is about to leave the floor (hereinafter referred to as a "floor-leaving movable leg 3") ascertains whether the present time is close to a scheduled floor-leaving time determined for the floor-leaving movable leg 3 from the target gait, a force component $Fz(i-1)$ detected along the Z-axis by the six-axis force sensor 6 of the floor-leaving movable leg 3 in a preceding cycle time is greater than a predetermined setting $Fz2$ which is preset as the force component Fz generated when the foot 7 ends leaving the floor, and a force component $Fz(i)$ detected along the Z-axis by the six-axis force sensor 6 of the floor-leaving movable leg 3 in the present cycle time is equal to or smaller than the predetermined setting $Fz2$, for thereby ascertaining whether the foot 7 of the floor-leaving movable leg 3 has ended leaving the floor in STEP6-6 (detection of the time to end leaving the floor). If the conditions in STEP6-6 are not satisfied (the foot 7 has not ended touching the floor), then control returns from the subroutine to the main routine shown in FIG. 5. If the conditions in STEP6-6 are satisfied (the foot 7 has ended leaving the floor), then the landing position estimator 14 outputs the reactive force center position x calculated with respect to the floor-leaving movable leg 3 in STEP6-1 as the landing position for the foot sole 7a to end leaving the floor, i.e., the position of the stair edge Se with respect to the foot sole 7a when the foot sole 7a ends leaving the floor, to the target gait generator 10 in STEP6-7. Thereafter, control returns from the subroutine to the main routine shown in FIG. 5.

When the foot 7 of the floor-leaving movable leg 3 ends leaving the floor after it has touched the floor, since the relatively large reactive force F is abruptly eliminated from the foot sole 7a which has been subjected to the reactive force F, the conditions $Fz(i-1)>Fz2$ and $Fz(i) \leq Fz2$ are satisfied in STEP6-6, it can basically be determined that the foot 7 has ended leaving the floor. The condition as to whether the present time is near the scheduled floor-leaving time is added in STEP6-6 for thereby detecting the time to end leaving the floor more reliably.

After the landing position detection processor 12 has executed the landing position detecting subroutine in STEP2 shown in FIG. 5, the controller 9 corrects parameters, such as a stride, etc. of the target gait generated for each of the movable legs 3 by the target gait generator 10 in subsequent cycle times based on the landing position to start touching the floor and the landing position to end leaving the floor, which have been detected by the landing position detection processor 12 as described above in STEP3.

Specifically, when the robot R ascends along the stair S, if the landing position to start touching the floor is closer to the toe than the heel of the foot 7 of the floor-touching movable leg 3, then the controller 9 corrects the gait parameters so as to slightly increase the stride of the movable leg 3, other than the floor-touching movable leg 3, when the other movable leg 3 leaves or touches the floor next time. If the landing position to start touching the floor is at the tip end of the heel of the foot 7 of the floor-touching movable leg 3, i.e., if the floor-touching movable leg 3 starts touching the floor within a stair step Ss except its stair edge Se, then the controller 9 corrects the gait parameters so as to reduce the stride of the movable leg 3, other than the floor-touching movable leg 3, when the other movable leg 3 leaves or touches the floor next time.

When the robot R descends along the stair S, if the landing position to end leaving the floor is closer to the heel than the toe of the foot 7 of the floor-leaving movable leg 3, then the controller 9 corrects the gait parameters so as to slightly reduce the stride of the floor-leaving movable leg 3 when the floor-leaving movable leg 3 touches the floor next time. If the landing position to end leaving the floor is at the toe of the foot 7 of the floor-leaving movable leg 3, i.e., if the floor-leaving movable leg 3 ends leaving the floor within a stair step Ss except its stair edge Se, then the controller 9 corrects the gait parameters so as to increase the stride of the floor-leaving movable leg 3 when the floor-leaving movable leg 3 touches the floor next time.

After having corrected the gait parameters, the joint controller 11 controls the actuators (not shown) to actuate the joints 2, 4, 5 according to the target joint angles for the joints 2, 4, 5 which have been calculated by the target gait generator 10 in STEP4.

According to the above walking control for the robot R, since the gait of the robot R when the robot R ascends along the stair S and the gait of the robot R when the robot R descends along the stair S are corrected depending on the landing position for the foot sole 7a to start touching the floor and the landing position for the foot sole 7a to end leaving the floor, the robot R can ascend and descend along the stair S without missing stair steps. The landing position for the foot sole 7a to start touching the floor and the landing position for the foot sole 7a to end leaving the floor can be determined through simple calculations based on the detected values Fx, Fz, My from the six-axis force sensor 6 (or the moment M'y obtained from the detected values Fx, My and the detected value Fz), or the detected values Fz, My if the detection reference point Q of the six-axis force sensor 6 is established at the foot sole 7a. Since the six-axis force sensor 6 is spaced upwardly from the foot 7 and held out of contact with the floor, the six-axis force sensor 6 is protected against damage and has increased durability.

In the above embodiment, the reactive force center position x is determined from time to time. However, the reactive force center position x may be determined according to the equation (3) based on the detected values from the six-axis force sensor 6 at the time to start touching the floor or the time to end leaving the floor, which is recognized from the force component Fz along the Z-axis, and the determined reactive force center position x may be estimated as the landing position for the foot sole 7a to start touching the floor and the landing position for the foot sole 7a to end leaving the floor.

A second embodiment of the present invention will be described below with reference to FIGS. 7 through 15. A legged moving robot used in the second embodiment is the same as the two-legged walking robot in the first embodiment as shown in FIGS. 1 through 3.

Figure 7:
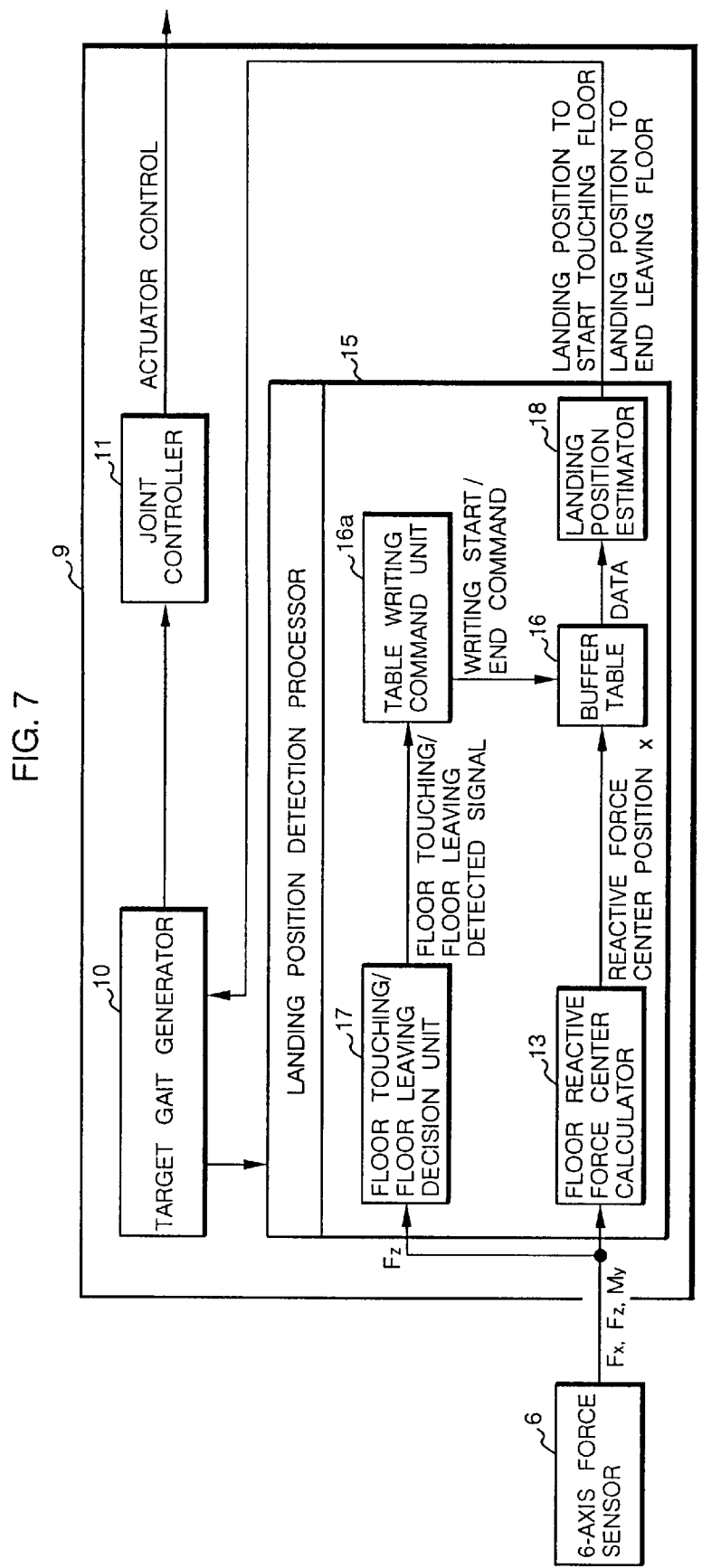
FIG. 7 is a block diagram of a controller according to a second embodiment of the present invention, which is installed on the legged moving robot shown in FIGS. 1 and 2.

As shown in FIG. 7, the robot R according to the second embodiment has a controller 9 that comprises a target gait generator 10 and a joint controller 11, which are identical to those shown in FIG. 4, associated with each of the movable legs 3. The controller 9 also has a landing position detection processor 15 which functions similarly to the landing position detection processor 12 shown in FIG. 4.

The landing position detection processor 15 has a floor reactive force center calculator 13 for calculating a reactive force center x according to the equation (3) in each cycle time based on the force components Fx, Fz and the moment My detected by the six-axis force sensor 6 of each of the movable legs 3 a buffer table 16 (ring buffer in this embodiment) for storing a time series of N data of the calculated reactive force center x, a floor touching/leaving decision unit 17 for detecting the touching on a floor and the leaving from a floor of the foot sole 7a of the foot of each of the movable legs 3, i.e., the time for the foot sole 7a to start touching a floor and the time for the foot sole 7a to end leaving a floor, based on the force component Fz detected by the six-axis force sensor 6, a table writing command unit 16a for instructing the buffer table 16 to store data of the reactive force center x calculated by the floor reactive force center calculator 13 based on the detection of the touching on a floor and the leaving from a floor of the foot sole 7a by the floor touching/leaving decision unit 17, and a landing position estimator 18 for estimating the landing position for the foot sole 7a to start touching the floor and the landing position for the foot sole 7a to end leaving the floor, based on the N data of the reactive force center x which have finally been stored in the buffer table 16.

Operation of the robot R as it walks, particularly, as it ascends and descends along the stair S, according to the second embodiment of the present invention will be described below with reference to FIGS. 8 through 15.

Figure 8:
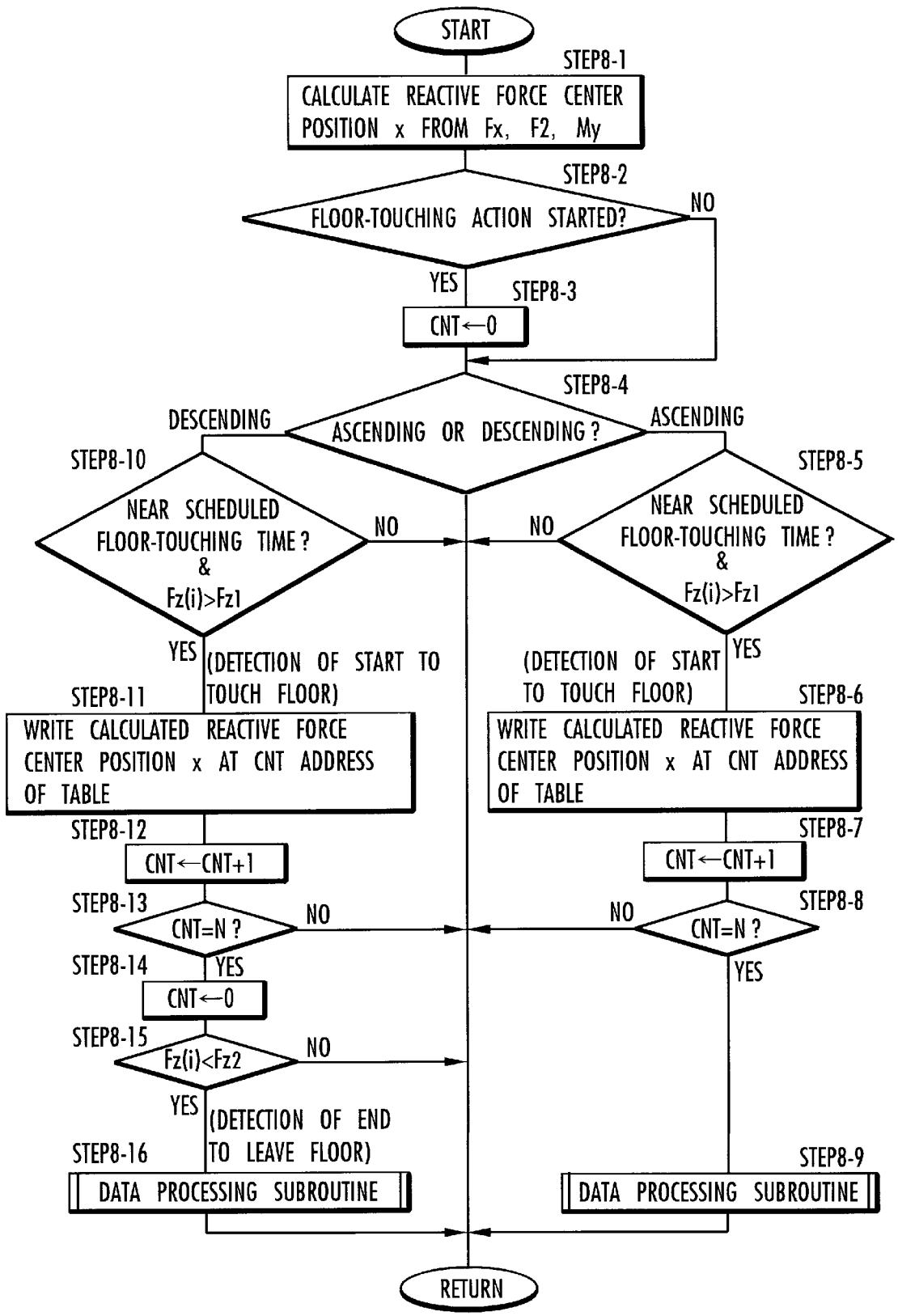
FIG. 8 is a flowchart of a main routine of the controller shown in FIG. 7.

When the robot R walks, the controller 9 executes the main routine as shown in FIG. 5 in predetermined cycle times. In STEP2 shown in FIG. 5, the landing position detection processor 15 of the controller 9 determines a landing position to start touching a floor and a landing position to end leaving a floor according to a landing position detecting subroutine shown in FIG. 8, as follows:

In FIG. 8, the floor reactive force center calculator 13 calculates a reactive force center position x for each of the movable legs 3 according to the equation (3) based on the force components Fx, Fz and the moment My which are detected by the six-axis force sensor 6 of each of the movable legs 3 at the present time in STEP8-1. Alternatively, if the detection reference point Q of the six-axis force sensor 6 is established at the foot sole 7a, then the floor reactive force center calculator 13 calculates a reactive force center position x according to the equation (4) based on the force component Fz and the moment My.

Then, the landing position detection processor 15 ascertains whether the foot 7 of each of the movable legs 3 has started an action to touch a floor or not, e.g., whether the foot 7 is in a most lifted state or not, depending on the target gait given by the target gait generator 10 in STEP8-2. If the foot 7 has not started an action to touch a floor, control goes to STEP8-4. If the foot 7 has started an action to touch a floor, a counter value CNT indicative of the address of a data storage area of the buffer table 16 is set to "0" in STEP8-3, and then control goes to STEP8-4.

In STEP8-4, the landing position detection processor 15 which corresponds to the floor-touching movable leg 3 whose foot 7 has started touching the floor ascertains whether the robot R is ascending or descending along a stair S. If the robot R is neither ascending nor descending, i.e., if the robot R is walking on plain terrain, then control returns from the subroutine to the main routine shown in FIG. 5.

If the robot R is ascending along a stair S, then the floor touching/leaving decision unit 17 of the landing position detection processor 15 which corresponds to the floor-touching movable leg 3 ascertains whether the present time is close to a scheduled floor-touching time determined for the floor-touching movable leg 3 from the target gait, and a force component Fz(i) detected along the Z-axis by the six-axis force sensor 6 of the floor-touching movable leg 3 in the present cycle time is greater than a predetermined setting Fz1, for thereby ascertaining whether the foot 7 of the floor-touching movable leg 3 has started touching the floor in STEP8-5 (detection of the time to start touching the floor). If the conditions in STEP8-5 are not satisfied (the foot 7 has not started touching the floor), then control returns from the subroutine to the main routine shown in FIG. 5. If the conditions in STEP8-5 are satisfied (the foot 7 has started touching the floor), then table writing command unit 16a instructs the buffer table 16 to store data at a data storage area having an address CNT indicated by a present counter value CNT, depending on the detection of the time to start touching the floor by the floor touching/leaving decision unit 17. At this time, the present reactive force center position x calculated by the floor reactive force center calculator 13 is stored in the data storage area at the address CNT of the buffer table 16 in STEP8-6.

Thereafter, the landing position detection processor 15 increments the counter value CNT by "1" in STEP8-7, and then ascertains whether the counter value CNT has reached a predetermined number N or not in STEP8-8. If CNT<N, then control returns from the subroutine to the main routine shown in FIG. 5.

According to the above steps, when the robot R ascends along the stair S, N data of the reactive force center position x are stored on a time-series basis in the buffer table 16 of the landing position detection processor 15 which corresponds to each of the movable leg 3 in data store areas thereof ranging from a data storage area having an address 0 to a data storage area having an address N−1, in respective cycle times from the time when the touching of the floor by the movable leg 3 is detected by the floor touching/leaving decision unit 17. Stated otherwise, the data of the reactive force center position x in the respective cycle times are stored on a time-series basis in the buffer table 16 from the time when the touching of the floor by the movable leg 3 is detected until the period represented by (cycle time×N) elapses.

When the N data are stored in the buffer table 16 and if CNT=N in STEP8-8, the landing position estimator 18 executes a data processing subroutine in STEP8-9 to estimate the landing position for the foot sole 7a to start touching the floor based on the N data of the reactive force center x which have finally been stored in the buffer table 16. The data processing subroutine in STEP8-9 will be described later on.

If the robot R is descending along a stair S, then the floor touching/leaving decision unit 17 of the landing position detection processor 15 which corresponds to the floor-touching movable leg 3 ascertains whether the present time is close to a scheduled floor-touching time determined for the floor-touching movable leg 3 from the target gait, and a force component Fz(i) detected along the Z-axis by the six-axis force sensor 6 of the floor-touching movable leg 3 in the present cycle time is greater than a predetermined setting Fz1, for thereby ascertaining whether the foot 7 of the floor-touching movable leg 3 has started touching the floor in STEP8-10. If the foot 7 has not started touching the floor, then control returns from the subroutine to the main routine shown in FIG. 5. If the foot 7 has started touching the floor, then table writing command unit 16a instructs the buffer table 16 to store data at a data storage area having an address CNT indicated by a present counter value CNT, depending on the detection of the time to start touching the floor by the floor touching/leaving decision unit 17. At this time, the present reactive force center position x calculated by the floor reactive force center calculator 13 is stored in the data storage area at the address CNT of the buffer table 16 in STEP8-11.

Thereafter, the landing position detection processor 15 increments the counter value CNT by "1" in STEP8-12, and then ascertains whether the counter value CNT has reached a predetermined number N or not in STEP8-13. If CNT<N, then control returns from the subroutine to the main routine shown in FIG. 5. If CNT=N in STEP8-13, the landing position detection processor 15 resets the counter value CNT to "0" in STEP8-14. Thereafter, the floor touching/leaving decision unit 17 ascertains whether the force component Fz(i) detected along the Z-axis by the six-axis force sensor 6 of the floor-touching movable leg 3 in the present cycle time is smaller than a predetermined setting Fz2 or not, for thereby detecting whether the foot sole 7a has ended leaving the floor or not in STEP8-15. If Fz(i)≧Fz2, i.e., if the foot sole 7a has not ended leaving the floor, then control returns from the subroutine to the main routine shown in FIG. 5.

According to the above steps, when the robot R descends along the stair S, N data of the reactive force center position x are stored, while being recurrently updated, in the buffer table 16 of the landing position detection processor 15 which corresponds to each of the movable leg 3 in data store areas thereof ranging from a data storage area having an address 0 to a data storage area having an address N–1, in respective cycle times from the time when the touching of the floor by the movable leg 3 is detected by the floor touching/leaving decision unit 17. Finally, the N data of the reactive force center position x are stored on a time-series basis in the buffer table 16 from the time when the end of the leaving from the floor by the foot sole 7a (Fz(i)<Fz2) is detected by the floor touching/leaving decision unit 17 until the period represented by (cycle time×N) elapses.

In this manner, the N data of the reactive force center position x are finally stored in the buffer table 16 from the time when the end of the leaving from the floor by the foot sole 7a is detected by the floor touching/leaving decision unit 17 until the period represented by (cycle time×N) elapses. If Fz(i)<Fz2 in STEP8-15, then landing position estimator 18 executes a data processing subroutine in STEP8-16 to estimate the landing position for the foot sole 7a to end leaving the floor based on the N data of the reactive force center x which have finally been stored in the buffer table 16. The data processing subroutine in STEP8-16 will be described later on.

Prior to describing the data processing subroutines in STEP8-9 and STEP8-16, the data of the reactive force center x stored in the buffer table 16 will be described below.

Figure 11A:
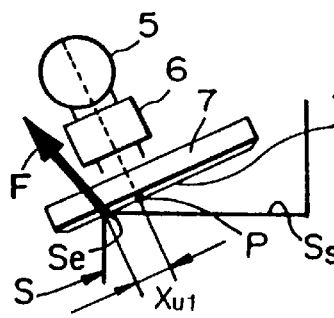
FIGS. 11A, 11B, 11C are side elevational views showing a floor touching action of the legged moving robot shown in FIGS. 1 and 2 as it ascends along a stair.
Figure 11B:
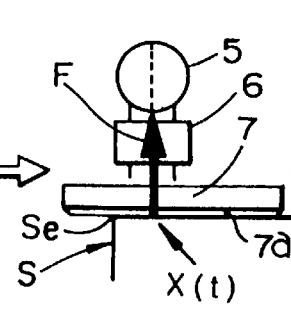
Figure 11C:
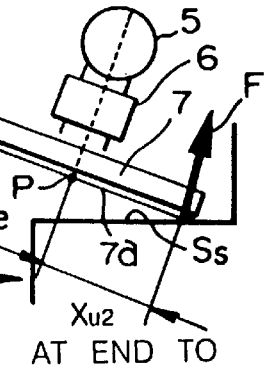

When the robot R ascends along the stair S, the foot 7 of each of the movable legs 3 contacts a stair step Ss and a stair edge Se from the time when the foot 7 touches the floor (the stair step Ss) to the time when the foot 7 leaves the floor (the stair step Ss), as shown in FIGS. 11A, 11B, 11C. The force component Fz along the Z-axis of the actual reactive force F applied to the foot sole 7a varies with time as shown in a lower portion of FIG. 12, and the actual reactive force center position x varies as shown in an upper portion of FIG. 12.

When the robot R descends along the stair S, the foot 7 of each of the movable legs 3 contacts a stair step Ss and a stair edge Se from the time when the foot 7 touches the floor (the stair step Ss) to the time when the foot 7 leaves the floor (the stair step Ss), as shown in FIGS. 13A, 13B, 13C. The force component Fz along the Z-axis of the actual reactive force F applied to the foot sole 7a varies with time as shown in a lower portion of FIG. 14, and the actual reactive force center position x varies as shown in an upper portion of FIG. 14.

In FIGS. 11A, 11B, 11C, 12, tut, tul represent the time of the instant the foot actually starts touching the floor and the time of the instant the foot actually ends leaving the floor, and xu1, xu2 represent actual reactive force center positions x respectively at the times tut, tul, i.e., actual positions for the foot 7 to start touching the floor and end leaving the floor. In FIGS. 13A, 13B, 13C, 14, tdt, tdl represent the time of the instant the foot actually starts touching the floor and the time of the instant the foot actually ends leaving the floor, and xd1, xd2 represent actual reactive force center positions x respectively at the times tdt, tdl, i.e., actual positions for the foot 7 to start touching the floor and end leaving the floor.

Figure 12:
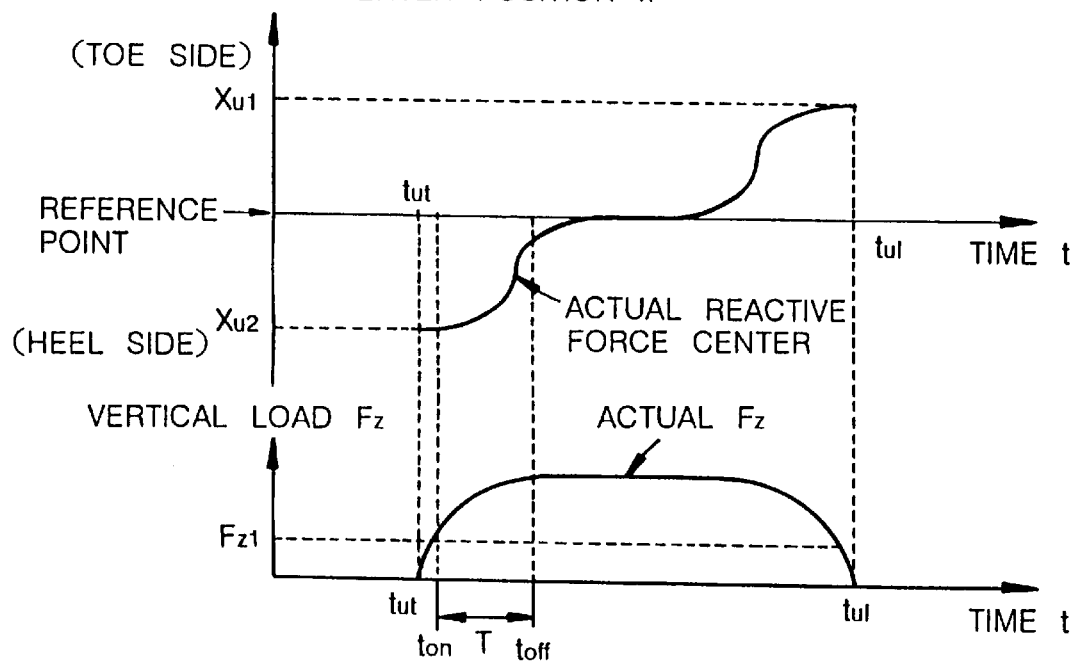
FIG. 12 is a diagram illustrative of processing operation of the controller shown in FIG. 7.

In FIGS. 12, 14, ton represents the time at which the data finally stored in the buffer table 16 (data of the reactive force center position calculated by the floor reactive force center calculator 13) start being written, and toff represents the time at which the data end being written. N data that are stored in the buffer table 16 during the data reading period T (cycle time×N) from the writing-start time ton to the writing-end time toff are finally held in the data table 16. The writing-start time ton during ascent of the stair S (FIG. 12) is the time when the force component Fz detected by the six-axis force sensor 6 becomes Fz>Fz1 and the start to touch the floor is detected by the floor touching/leaving decision unit 17, and the writing-end time toff during descent of the stair S (FIG. 14) is the time when the force component Fz detected by the six-axis force sensor 6 becomes Fz>Fz2 and the end to leave the floor is detected by the floor touching/leaving decision unit 17.

If it is assumed that the reactive force center position x calculated from the detected values of the six-axis force sensor 6 by the floor reactive force center calculator 13 is highly accurate and agrees an actual reactive force center position, then when the robot R ascends along the stair S, the reactive force center position x which is calculated by the floor reactive force center calculator 13 at the time when the start to touch the floor is detected by the floor touching/leaving decision unit 17, i.e., the writing-start time ton shown in FIG. 12, agrees highly accurately with the actual landing position xu1 to start touching the floor. Likewise, when the robot R descends along the stair S, the reactive force center position x which is calculated by the floor reactive force center calculator 13 at the time when the end to leave the floor is detected by the floor touching/leaving decision unit 17, i.e., the writing-end time toff shown in FIG. 14, agrees highly accurately with the actual landing position xd2 to end leaving the floor. According to the first embodiment described above, the landing position to start touching the floor and the landing position to end leaving the floor are determined on the basis of the above assumption.

Actually, however, the reactive force center position x which is calculated by the floor reactive force center calculator 13 has an error with respect to the actual reactive force center position because of noise contained in the detected values from the six-axis force sensor 6, calculation errors, and flexing of the foot 7. Therefore, when the robot R ascends along the stair S, the data of the reactive force center position x which is calculated by the floor reactive force center calculator 13 from the time the foot 7 starts touching the floor tend to deviate from the actual reactive force center position, as indicated by blank dots shown in FIG. 15. Similar data deviations also occur when the robot R descends along the stair S.

In view of such data deviations, according to the second embodiment, the landing position to start touching the floor at the time the robot R ascends along the stair S and the landing position to end leaving the floor at the time the robot R descends along the stair S are estimated from the N data of the reactive force center position x which are finally held in the buffer table 16. In this regard, even if the N data of reactive force center position x are averaged, the average value does not agree accurately with the actual landing position xu1 to start touching the floor and the actual landing position xd2 to end leaving the floor.

More specifically, when the robot R ascends along the stair S, the actual reactive force center position from the time the foot 7 starts touching the floor varies as shown in FIG. 15, and hence the N data of the reactive force center position vary generally with the actual reactive force center position. Therefore, an average value m of the N data as shown in FIG. 15 has a relatively large error with respect to the reactive force center position (the landing position xu1 to start touching the floor) at the time the foot 7 starts touching the floor. This also holds true when the robot R descends along the stair S.

According to findings of the inventors based on various research and experimental efforts, a value xs which represents the sum of the average value m and the square root $\sigma^{1/2}$ of a variance $\sigma$ of the data of the reactive force center position x is in relatively accurate compliance with the actual landing position xu1 to start touching the floor when the robot R ascends along the stair S, as shown in FIG. 15. When the robot R descends along the stair S, a value which represents the sum of the average value m and the square root $\sigma^{1/2}$ of the variance $\sigma$ of the data of the reactive force center position x is in relatively accurate compliance with the actual landing position xd2 to end leaving the floor. Furthermore, the accuracy of agreement with the actual landing position xd2 to end leaving the floor can be increased by adding, to the average value m, a value which is produced when the square root $\sigma^{1/2}$ is multiplied by a suitable corrective coefficient of about "1". Since the data of the reactive force center position x is negative toward the heel of the foot 7 and positive toward the toe of the foot 7 (see FIG. 3), adding the product of the square root $\sigma^{1/2}$ and the corrective coefficient to the average value m when the robot R ascends along the stair S is equivalent to calculating $(m-w_1 \cdot \sigma^{1/2})$ where $w_1$ represents the corrective coefficient $(w_1>0)$, and adding the product of the square root $\sigma^{1/2}$ and the corrective coefficient to the average value m when the robot R descends along the stair S is equivalent to calculating $(m+w_2 \cdot \sigma^{1/2})$ where $w_2$ represents the corrective coefficient $(w_1>0)$.

FIG. 9 shows the data processing subroutine in STEP8-9 in detail. In the data processing subroutine shown in FIG. 9 when the robot R ascends along the stair S, the landing position estimator 18 determines an average value m and a variance $\sigma$ from the N data of the reactive force center position x which are finally held in the buffer table 16 in STEP9-1. Then, the landing position estimator 18 calculates the difference between the average value m and the product of the square root $\sigma^{1/2}$ of the variance $\sigma$ and the corrective coefficient $w_1$ $(m-w_1 \cdot \sigma^{1/2})$, as a landing position for the foot sole 7a to start touching the floor in STEP9-2.

FIG. 10 shows the data processing subroutine in STEP8-16 in detail. In the data processing subroutine shown in FIG. 10 when the robot R descends along the stair S, the landing position estimator 18 determines an average value m and a variance $\sigma$ from the N data of the reactive force center position x which are finally held in the buffer table 16 in STEP10-1. Then, the landing position estimator 18 calculates the sum of the average value m and the product of the square root $\sigma^{1/2}$ of the variance $\sigma$ and the corrective coefficient $w_2$ $(m+w_2 \cdot \sigma^{1/2})$, as a landing position for the foot sole 7a to end leaving the floor in STEP10-2.

The landing position for the foot sole 7a to start touching the floor, thus determined when the robot R ascends along the stair S, and the landing position for the foot sole 7a to end leaving the floor, thus determined when the robot R descends along the stair S are then supplied to the target gait generator 10, and the controller 9 corrects gait parameters, such as a stride, etc. in the main routine shown in FIG. 5.

Since the landing position for the foot sole 7a to start touching the floor when the robot R ascends along the stair S and the landing position for the foot sole 7a to end leaving the floor when the robot R descends along the stair S are thus determined and the gait of the robot R is corrected on the basis of the determined landing positions, the robot R can be controlled to ascend and descend along the stair S without missing stair steps. Because the landing position for the foot sole 7a to start touching the floor and the landing position for the foot sole 7a to end leaving the floor can accurately be determined, the walking control of the robot R can stably be carried out. The landing position for the foot sole 7a to start touching the floor and the landing position for the foot sole 7a to end leaving the floor are calculated using a plurality of (N) data of the reactive force center position x which are calculated from the detected values Fx, Fz, My from the six-axis force sensor 6 (or the moment M'y obtained from the detected values Fx, My and the detected value Fz), or the detected values Fz, My if the detection reference point Q of the six-axis force sensor 6 is established at the foot sole 7a. Inasmuch as only the average value m and the variance $\sigma$ of those data are additionally calculated, the controller 9 does not suffer a large burden when it carries out required calculations. Furthermore, since the six-axis force sensor 6 is spaced upwardly from the foot 7 and held out of contact with the floor, the six-axis force sensor 6 is protected against damage and has increased durability.

In the above first and second embodiments, the landing position for the foot sole 7a to start touching the floor and the landing position for the foot sole 7a to end leaving the floor are calculated on the assumption that the foot 7 is free of deformations such as flexing, etc. However, an amount of flexing of the foot 7 under a reactive force from the floor (the stair S) may be estimated, and the landing position for the foot sole 7a to start touching the floor and the landing position for the foot sole 7a to end leaving the floor may be calculated in view of such an estimated amount of flexing.

In the second embodiment where the landing position for the foot sole 7a to start touching the floor and the landing position for the foot sole 7a to end leaving the floor are calculated using a plurality of data of the reactive force center position x, when the robot R ascends the stair S, one of the plural data which is of a value spaced a certain number of data values from the smallest data value may be determined as representing the landing position for the foot sole 7a to start touching the floor, and conversely, when the robot R descends the stair S, one of the plural data which is of a value spaced a certain number of data values from the largest data value may be determined as representing the landing position for the foot sole 7a to end leaving the floor. Moreover, of the plural data, a certain number of data values as counted from the largest data value (absolute value) may be dispensed with, and the landing position for the foot sole 7a to start touching the floor and the landing position for the foot sole 7a to end leaving the floor may be determined from the remaining data.

In the second embodiment, the landing position for the foot sole 7a to start touching the floor and the landing position for the foot sole 7a to end leaving the floor are determined using the average value m and the variance σ of the plural data of the reactive force center position x. However, the landing position for the foot sole 7a to start touching the floor and the landing position for the foot sole 7a to end leaving the floor may be determined as follows:

When the robot 3 ascends along the stair S, it is assumed that a time-dependent change of the reactive force center position x from the time when the foot 7 starts touching the floor is approximated by a polynomial, e.g., the following quadratic equation (5):

$$x(t)=a \cdot t^2+b \cdot c+c \qquad (5)$$

The quadratic equation (5) is determined by determining the coefficients a, b, c thereof from the calculated plural data of the reactive force center position x according to the method of least squares. As shown in FIG. 15, the quadratic equation (5) can be determined as indicated by the two-dot-and-dash line r. In FIG. 15, a reactive force center position x at a time (ton−Δtu) which goes back from the writing-start time ton by a time interval Δtu that has been predicted in advance as being required from the actual time to start touching the floor to the detected time to start touching the floor (the writing-start time ton) is determined as the landing position to start touching the floor according to the quadratic equation (5).

The above process can be applied to determine the landing position to end leaving the floor when the robot R descends along the stair S. In such a case, the quadratic equation (5) which approximates a time-dependent change of the position x is determined, in the same manner as described above, from the plural data of the reactive force center position x which are finally held in the buffer table 16 according to the method of least squares. Then, a reactive force center position x at a time which goes back from the writing-end time toff by a given time interval that has been predicted in advance as being required from the detected time to end leaving the floor (the writing-end time toff) to the actual time to end leaving the floor is determined as the landing position to end leaving the floor according to the quadratic equation (5).

In the above process, the quadratic equation is employed as a polynomial which approximates a time-dependent change of the reactive force center position x. However, a polynomial of a higher degree may be determined according to the method of least squares, and the landing position for the foot sole 7a to start touching the floor and the landing position for the foot sole 7a to end leaving the floor may be determined according to such a polynomial.

Inasmuch as the landing position for the foot sole 7a to start touching the floor and the landing position for the foot sole 7a to end leaving the floor are determined from the plural data of the reactive force center position x using the method of least squares, the landing position to start touching the floor at the actual time to start touching the floor and the landing position to end leaving the floor at the actual time to end leaving the floor can be determined accurately.

In the above embodiments, the landing position for the foot sole 7a to start touching the floor and the landing position for the foot sole 7a to end leaving the floor are detected when the robot R ascends and descends along the stair S. However, the landing position for the foot sole 7a to start touching the floor and the landing position for the foot sole 7a to end leaving the floor may be detected when the robot R walks a floor with surface irregularities in the same manner as with the above embodiments.

While the two-legged walking robot has been described in the above embodiments, the principles of the present invention are also applicable to a robot having more than two movable legs.

Although certain preferred embodiments of the present invention have been shown and described in detail, it should be understood that various changes and modifications may be made therein without departing from the scope of the appended claims.

What is claimed is:

1. An apparatus for detecting the landing position of a foot sole of a legged moving robot having a plurality of movable legs, comprising:

a force sensor mounted between an ankle joint and a foot sole on each of the movable legs, for detecting at least a force perpendicular to said foot sole and a moment about an axis extending in a lateral direction of the foot sole and passing through a predetermined reference point on said foot sole;

means for detecting a time when the foot sole touches the floor based on the perpendicular force detected by said force sensor, and for determining a landing position for the foot sole based on the perpendicular force and the moment detected by said force sensor, at the detected time or in a predetermined time range near said detected time.

2. An apparatus according to claim 1, wherein said means comprises means for detecting the time the foot sole touches the floor when said perpendicular force detected by said force sensor reaches to a predetermined value.

3. An apparatus according to claim 1, wherein said means for detecting comprises means for determining, from time to time, a central position of a reactive force applied from the floor to the foot sole resulting from the perpendicular force and the moment detected by said force sensor; and means for determining the landing position for the foot sole based on a determined central position at the detected time or in a predetermined time range near said detected time.

4. An apparatus according to claim 3, wherein said means for detecting comprises means for determining the landing position for the foot sole based on a time series of data of the central position which are determined from said detected time until a predetermined time.

5. An apparatus according to claim 4 wherein said means for detecting comprises means for determining, at a detected time, a sum of an average value of the time series of data of the central position and the square root of a variance of the time series of data of the central position or the product of said square root and a predetermined corrective coefficient.

6. An apparatus for detecting a lift-off position of a foot sole of a legged moving robot having a plurality of movable legs, comprising:

a force sensor mounted between an ankle joint and a foot sole on each of the movable legs, for detecting at least force perpendicular to said foot sole and a moment about an axis extending in a lateral direction of the foot sole and passing through a predetermined reference point on said foot sole; and means for detecting a foot lift-off time when the foot sole leaves the floor based on the perpendicular force detected by said force sensor, and a foot lift-off position for the foot sole based on the perpendicular force and the moment detected by said force sensor, at the detected time or in a predetermined range near said detected time.

7. An apparatus according to claim 6 wherein said means for detecting comprises means for determining the time the foot sole leaves the floor when said perpendicular force detected by said force sensor decreases to a predetermined value.

8. An apparatus according to claim 6, wherein said means for detecting comprises means for determining, from time to time, a central position of a reactive force applied from the floor to the foot sole resulting from the perpendicular force and the moment detected by said force sensor, and determining the foot lift-off position based on said central position determined at the detected time or in a predetermined time range near said detected time.

9. An apparatus according to claim 8, wherein the said means for detecting comprises means for determining the foot lift-off position based on a time series of data of the central position which are determined from said detected time until a predetermined time.

10. An apparatus according to claim 9, wherein the said means for detecting comprises means for determining, as the foot lift-off position, the sum of an average value of the time series of data of the central position and the square root of a variance of the time series of data of the central position or the product of said square root and a predetermined corrective coefficient.

11. A method for detecting the landing position of a foot sole of a legged walking robot, comprising the steps of:
  measuring a force perpendicular to the foot sole as the foot contacts the ground;
  measuring a moment about an axis extending in a lateral direction of the foot sole and passing through a predetermined reference point on the foot sole;
  detecting a time when the foot sole touches the ground; and
  calculating a landing position for the foot sole, based on the measured force and moment, at the detected time or in a predetermined time range near the detected time.

12. An apparatus for detecting the landing position of the sole of a foot of a legged moving robot having movable legs comprising:
  a force sensor on each of the movable legs, for detecting at least a force perpendicular to said foot sole and a moment about an axis extending in a lateral direction of the foot sole and passing through a predetermined reference point on said foot sole;
  means for detecting a time when the foot sole touches the floor based on the perpendicular force detected by said force sensor, and a landing position for the foot sole based on the perpendicular force and the moment detected by said force sensor, at the detected time or in a predetermined time range near said detected time;
  said means for detecting including means for determining, from time to time, a central position of a reactive force applied from the floor to the foot sole, and determining the landing position for the foot sole to starting touching the floor based on a time series of data determined from the detected time until a predetermined time; and
  said means for detecting further including means for determining a polynomial which approximates a time-dependent change of the central position from the time series of data of the central position according to a method of least squares, estimating said central position at a time spaced apart from said detected time by a predetermined time interval according to said polynomial, and producing said estimated central position as the landing position for the foot sole.

13. An apparatus for detecting a lift-off position of a foot sole of a legged moving robot having a plurality of movable legs, comprising:
  a force sensor mounted on each of the movable legs, for detecting at least a force perpendicular to said foot sole and a moment about an axis extending in a lateral direction of the foot sole and passing through a predetermined reference point on said foot sole;
  means for detecting a lift-off time when the foot sole leaves the floor based on the perpendicular force detected by said force sensor, and a lift-off position where the foot leaves the floor, based on the perpendicular force and the moment detected by said force sensor, at the detected time or in a predetermined range near said detected time;
  said means for detecting including means for determining, from time to time, a central position of a reactive force applied from the floor to the foot sole, and determining the lift-off position based on a time series data determined at the detected time until a predetermined time range near said detected time; and
  said means for detecting further including means for determining a polynomial which approximates a time-dependent change of the central position from the time series of data of the central position according to a method of least squares, estimating said central position at a time spaced from said detected time by a predetermined time interval according to said polynomial, and producing said estimated central position as the landing position for the foot sole to end leaving the floor.

* * * * *